(12) United States Patent
Hwang et al.

(10) Patent No.: US 10,375,709 B2
(45) Date of Patent: Aug. 6, 2019

(54) METHOD AND LC DEVICE FOR TRANSMITTING SCHEDULING REQUEST

(71) Applicant: LG ELECTRONICS INC., Seoul (KR)

(72) Inventors: Daesung Hwang, Seoul (KR); Yunjung Yi, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/571,498

(22) PCT Filed: May 4, 2016

(86) PCT No.: PCT/KR2016/004692
§ 371 (c)(1),
(2) Date: Nov. 2, 2017

(87) PCT Pub. No.: WO2016/182260
PCT Pub. Date: Nov. 17, 2016

(65) Prior Publication Data
US 2018/0139764 A1 May 17, 2018

Related U.S. Application Data

(60) Provisional application No. 62/158,548, filed on May 8, 2015.

(51) Int. Cl.
*H04W 72/12* (2009.01)
*H04L 1/18* (2006.01)
(Continued)

(52) U.S. Cl.
CPC ............... *H04W 72/12* (2013.01); *H04L 1/18* (2013.01); *H04L 1/1861* (2013.01);
(Continued)

(58) Field of Classification Search
CPC ............ H04W 72/12; H04W 72/0413; H04W 72/0446; H04L 1/18
See application file for complete search history.

(56) References Cited

U.S. PATENT DOCUMENTS

| 2011/0205981 | A1* | 8/2011 | Koo ..................... H04L 1/1671 370/329 |
| 2012/0084618 | A1* | 4/2012 | Choudhury ......... H03M 13/136 714/752 |

(Continued)

FOREIGN PATENT DOCUMENTS

| KR | 20100091130 | 8/2010 |
| KR | 20120048433 | 5/2012 |

OTHER PUBLICATIONS

Intel Corporation, "On PUCCH and UCI transmission for MTC," 3GPP TSG-RAN WG1 #80, R1-151431, Apr. 2015, 6 pages.
(Continued)

*Primary Examiner* — Chi Ho A Lee
(74) *Attorney, Agent, or Firm* — Lee Hong Degerman Kang & Waimey

(57) ABSTRACT

The present description provides a method for transmitting a scheduling request (SR) in a low-capability (LC) or low-cost (LC) device. The method can comprise a step for receiving an upper layer signal comprising an SR subframe offset and an SR transmission period. The upper layer signal can further comprise information about the number of repetitions. Also, the method can comprise the steps of: determining, on the basis of the SR transmission period and SR subframe offset, a subframe on which the SR is to be transmitted; determining the number of repeated transmissions of the SR on the basis of the information; and transmitting the SR on the determined subframe. The SR can
(Continued)

repeatedly be transmitted on a plurality of subframes that begin from the determined subframe.

10 Claims, 12 Drawing Sheets

(51) Int. Cl.
*H04W 72/04* (2009.01)
*H04L 5/00* (2006.01)

(52) U.S. Cl.
CPC ....... *H04L 5/0091* (2013.01); *H04W 72/0413* (2013.01); *H04W 72/0446* (2013.01); *H04L 5/0053* (2013.01); *H04W 72/1284* (2013.01)

(56) References Cited

U.S. PATENT DOCUMENTS

| | | | | |
|---|---|---|---|---|
| 2012/0182908 A1* | 7/2012 | Pan | ...................... | H04W 28/18 370/280 |
| 2012/0269154 A1* | 10/2012 | Wang | ................ | H04W 72/1242 370/329 |
| 2013/0022012 A1* | 1/2013 | Lee | .................... | H04W 52/0216 370/329 |
| 2013/0241824 A1* | 9/2013 | Spektor | .............. | G06K 9/00355 345/156 |
| 2013/0250828 A1* | 9/2013 | Chou | ................ | H04W 72/0413 370/311 |
| 2014/0050107 A1* | 2/2014 | Charbit | ............. | H04W 72/1289 370/252 |
| 2014/0078974 A1 | 3/2014 | Falahati et al. | | |
| 2015/0078224 A1 | 3/2015 | Xiong et al. | | |
| 2015/0289251 A1* | 10/2015 | Koc | ..................... | H04W 72/12 370/311 |
| 2016/0270110 A1* | 9/2016 | Dinan | ................... | H04L 5/0053 |
| 2018/0063832 A1* | 3/2018 | Yamada | ............ | H04W 72/0413 |

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.

PCT International Application No. PCT/KR2016/004692, Written Opinion of the International Searching Authority dated Aug. 18, 2016, 10 pages.

* cited by examiner

METHOD AND LC DEVICE FOR TRANSMITTING SCHEDULING REQUEST

CROSS-REFERENCE TO RELATED APPLICATIONS

This application is the National Stage filing under 35 U.S.C. 371 of International Application No. PCT/KR2016/004692, filed on May 4, 2016, which claims the benefit of U.S. Provisional Application No. 62/158,548, filed on May 8, 2015, the contents of which are all hereby incorporated by reference herein in its entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC devices, wide service areas, low traffic for each MTC device, etc.

In order to enhance a supply rate through a low-cost of the MTC device, a discussion is being performed in which the MTC device enables to use only a sub-band reduced to, for example, about 1.4 MHz regardless of an entire system bandwidth of a cell.

However, for the MTC device operating in a reduced partial band, a redefinition of an RB mapping method or a transmitting method of physical channels may be required.

SUMMARY OF THE INVENTION

Accordingly, the disclosure of the specification has been made in an effort to solve the problem.

To achieve the foregoing purposes, the disclosure of the present invention proposes a method for transmitting a scheduling request (SR). The method may be performed by a low-cost/low-capability (LC) device and comprise: receiving a higher layer signal including a SR transmission periodicity and a SR subframe offset, the higher layer signal further including information on a repetition number; determining a subframe to transmit the SR based on the SR transmission periodicity and the SR subframe offset; determining a number for repeatedly transmitting the SR based on the information; and transmitting the SR on the determined subframe. The SR may be repeatedly transmitted on a plurality of subframes starting from the determined subframe.

If transmission of hybrid automatic repeat request (HARQ) acknowledgement (ACK)/non-acknowledgement (NACK) is required after the SR is triggered, the SR may be transmitted using a Physical Uplink Control Channel (PUCCH) format 1B, and a Most Significant Bit (MSB) of the SR may be set to 0, and when the SR is a positive SR, a Least Significant Bit (LSB) of the SR may be set to 1.

After the SR is triggered, when transmission of HARQ ACK/NACK is required, an MSB of the SR may be set according to a value of the HARQ ACK/NACK from a transmission time point of the HARQ ACK/NACK.

The SR may be together transmitted only when HARQ ACK/NACK is transmitted.

The SR may be joint-encoded and transmitted with the HARQ ACK/NACK.

The SR may be together transmitted only when periodic Channel State Information (CSI) is transmitted.

The SR may be joint-encoded and transmitted with the periodic CSI.

To achieve the foregoing purposes, the disclosure of the present invention proposes a low-cost/low-capability (LC) device for transmitting a scheduling request (SR). The LC device comprise: a transceiver configured to receive a higher layer signal including a SR transmission periodicity and a SR subframe offset, the higher layer signal further including information on a repetition number. The LC device may comprise a processor configured to determine a subframe to transmit the SR based on the SR transmission periodicity and the SR subframe offset; determine a number for repeatedly transmitting the SR based on the information; and control the transceiver to transmit the SR on the determined subframe. The SR may be repeatedly transmitted on a plurality of subframes starting from the determined subframe.

Advantageous Effects

According to the disclosure of the present specification, the problems of the above-described prior art are solved.

DESCRIPTION OF EXEMPLARY EMBODIMENTS

Figure 1:
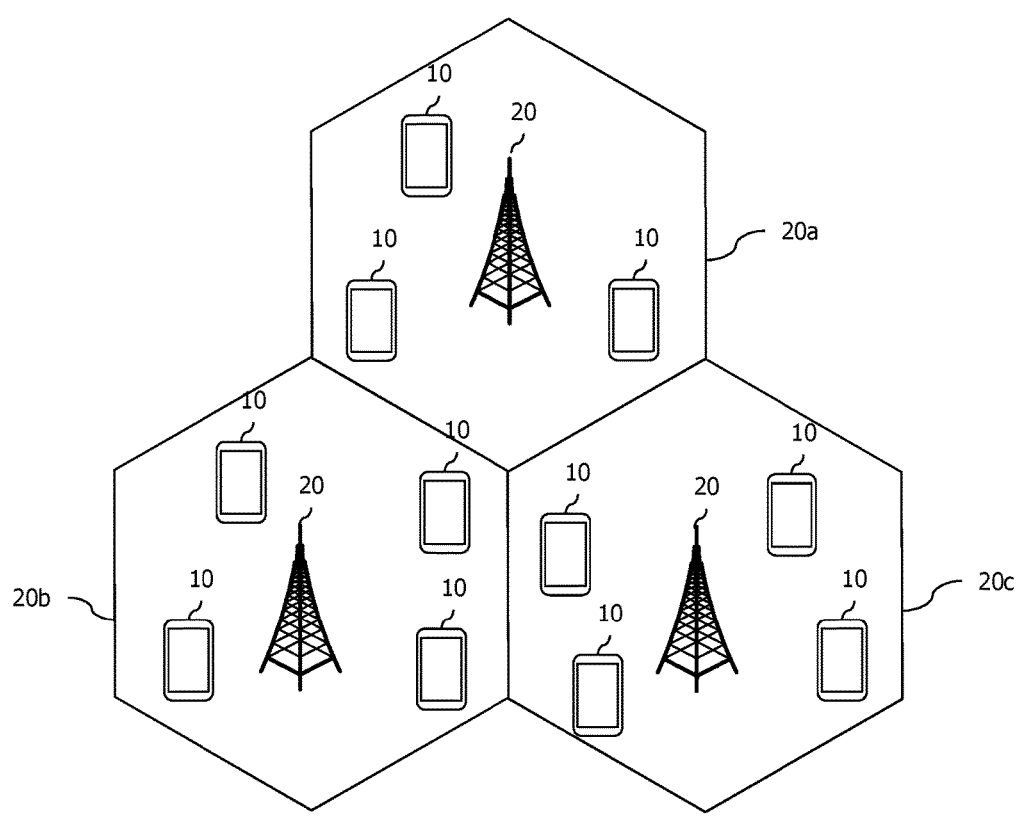
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
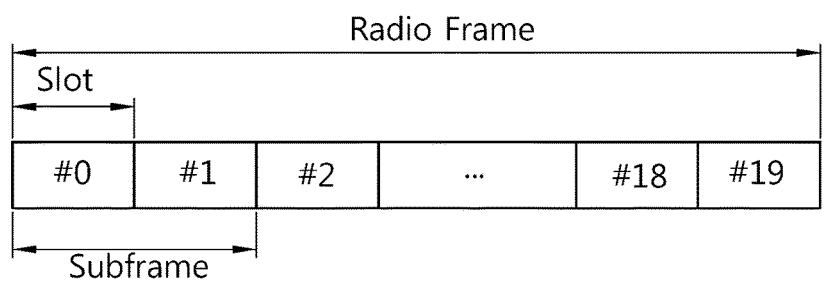
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
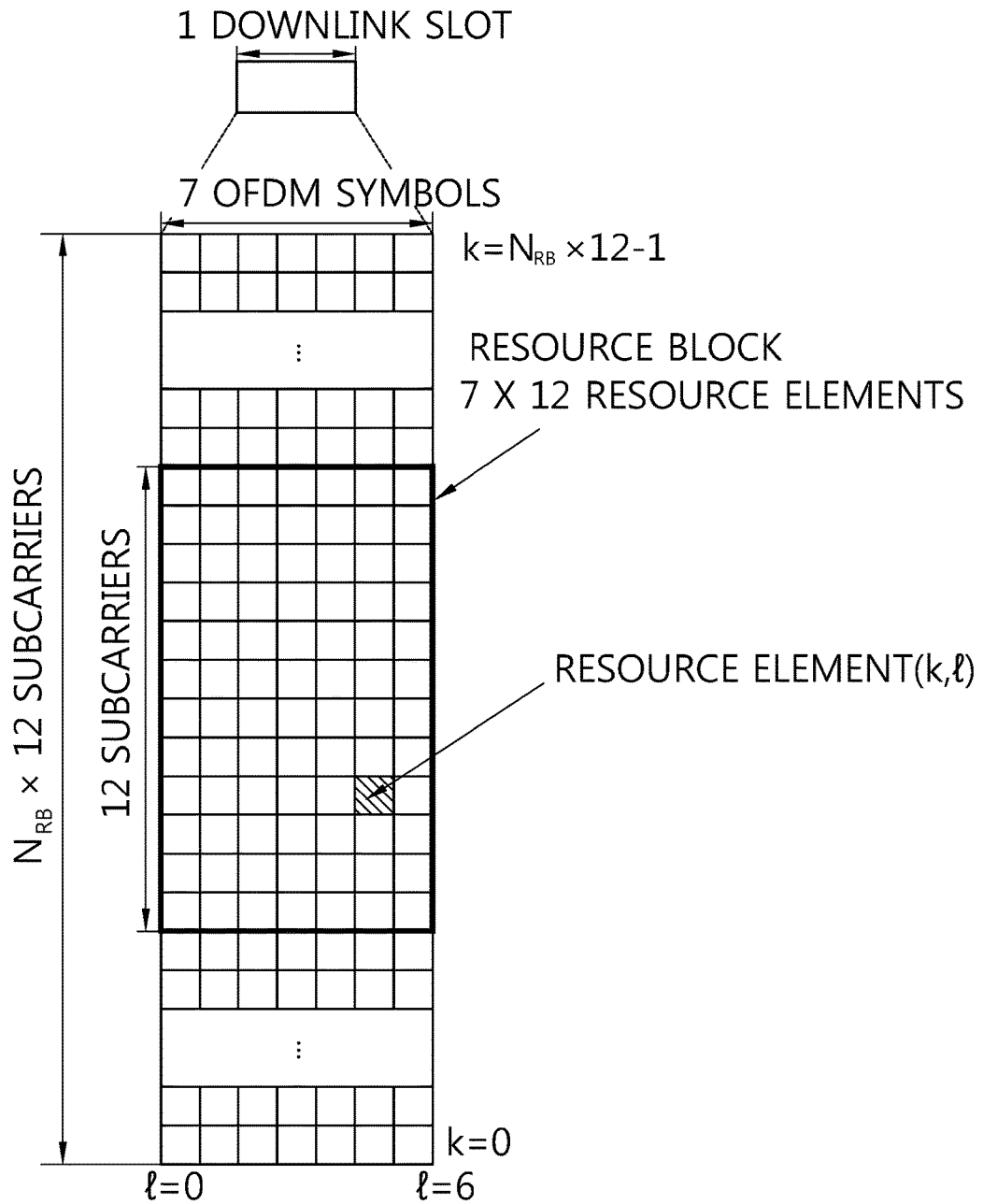
FIG. 3 illustrates the architecture of a downlink radio frame according to time division duplex (TDD) in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
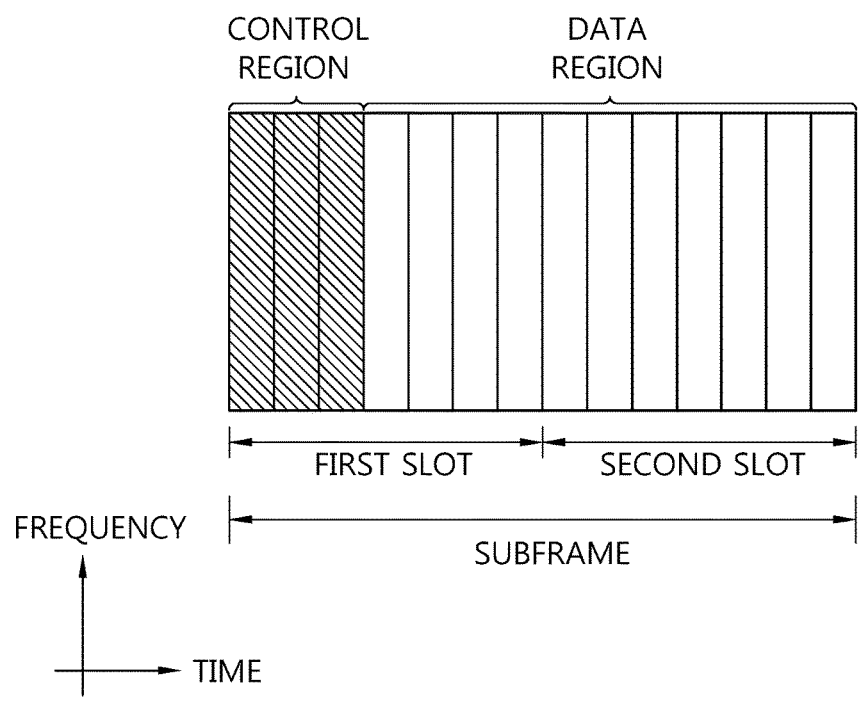
FIG. 4 illustrates an example resource grid for one uplink or downlink slot in 3GPP LTE.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The uplink channels include a PUSCH, a PUCCH, an SRS (Sounding Reference Signal), and a PRACH (physical random access channel).

Figure 5:
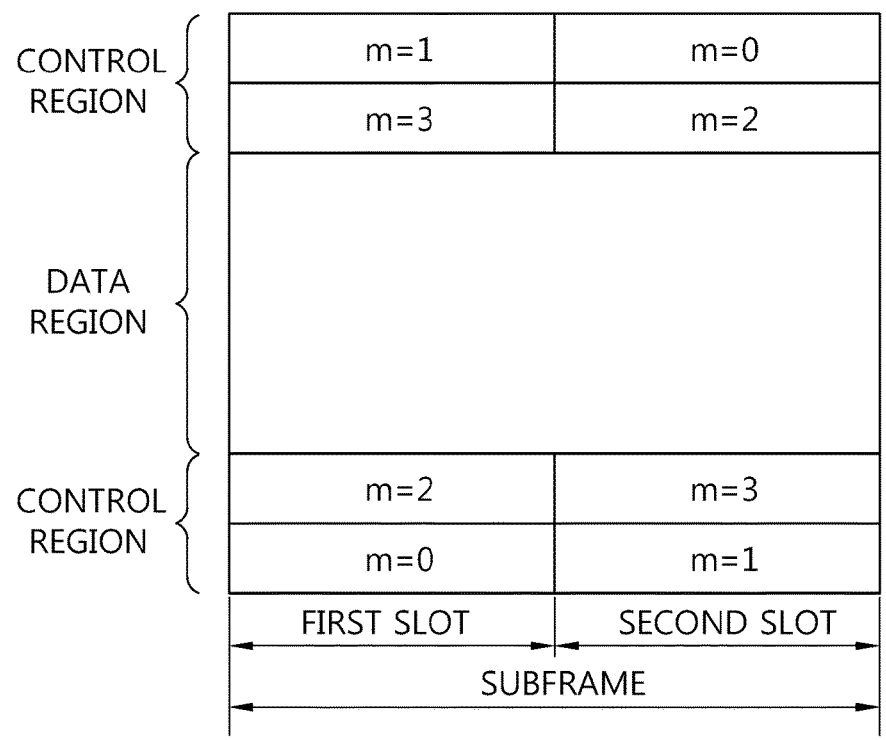
FIG. 5 illustrates the architecture of a downlink subframe.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 6:
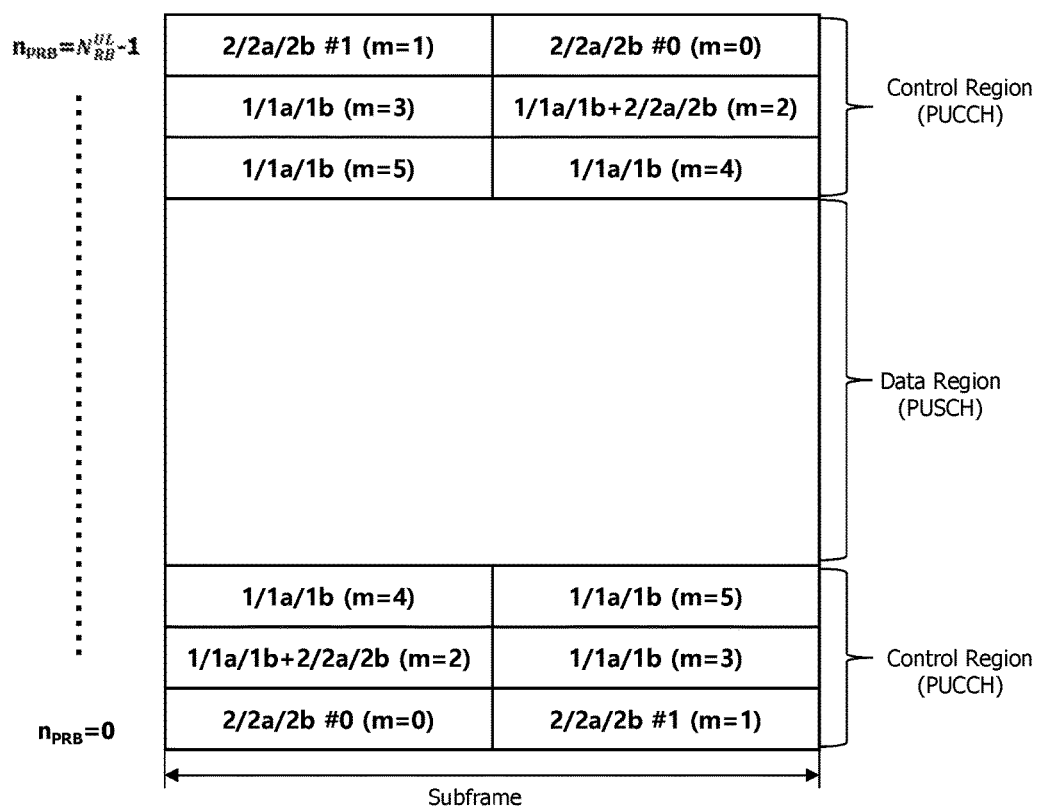
FIG. 6 is an exemplary diagram illustrating a transmission region based on the PUCCH formation.

FIG. 6 illustrates the PUCCH and the PUSCH on an uplink subframe.

PUCCH formats will be described with reference to FIG. 6.

The PUCCH format 1 carries the scheduling request (SR). In this case, an on-off keying (OOK) mode may be applied. The PUCCH format 1a carries acknowledgement/non-acknowledgement (ACK/NACK) modulated in a binary phase shift keying (BPSK) mode with respect to one codeword. The PUCCH format 1b carries ACK/NACK modulated in a quadrature phase shift keying (QPSK) mode with respect to two codewords. The PUCCH format 2 carries a channel quality indicator (CQI) modulated in the QPSK mode. The PUCCH formats 2a and 2b carry the CQI and the ACK/NACK.

A table given below carries the PUCCH formats.

TABLE 1

| Format | Modulation mode | Total bit count per subframe | Description |
| --- | --- | --- | --- |
| Format 1 | Undecided | Undecided | Scheduling request (SR) |
| Format 1a | BPSK | 1 | ACK/NACK of 1-bit HARQ, scheduling request (SR) may be present or not present |
| Format 1b | QPSK | 2 | ACK/NACK of 2-bit HARQ, scheduling request (SR) may be present or not present |
| Format 2 | QPSK | 20 | In case of extended CP, CSI and 1-bit or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACKs/NACKs, CSI, and scheduling request (SR) may be present or not present |

Each PUCCH format is transmitted while being mapped to a PUCCH region. For example, the PUCCH format 2/2a/2b is transmitted while being mapped to resource blocks (m=0 and 1) of band edges assigned to the UE. A mixed PUCCH RB may be transmitted while being mapped to a resource block (e.g., m=2) adjacent to the resource block to which the PUCCH format 2/2a/2b is assigned in a central direction of the band. The PUCCH format 1/1a/1b in which the SR and the ACK/NACK are transmitted may be disposed in a resource block in which m=4 or m=5. The number (N(2)RB) of resource blocks which may be used in the PUCCH format 2/2a/2b in which the CQI is transmitted may be indicated to the UE through a broadcasted signal.

<(Scheduling Request: SR)>

In order to receive allocation of an uplink resource from the base station, the UE performs an SR process. The SR includes a PUCCH SR that simply performs a flag function, and this is a 1 bit signal. An SR of a flag format was designed to reduce an uplink overhead.

When the SR is triggered, until the SR is cancelled, it is regarded that the SR is pending. In SRs, a MAC protocol data unit (PDU) is assembled, and when the PDU includes a PDU including an entire buffer state of a final event, or when UL grant is received and when the received UL grant may receive entire pending UL data for transmission, the entire pending UL data are cancelled.

When the SR is triggered and when another pending SR does not exist, an MAC entity sets a counter of the SR, for example, SR_COUNTER to 0.

Whenever one SR is pending, the MAC entity operates at each TTI as follows.

When an UL-SCH resource available for transmission does not exist in the TTI,
if the MAC entity does not have an effective PUCCH resource set for the SR at a random TTI,
the MAC entity performs a random access procedure.

However, when the MAC entity has an effective PUCCH resource set for SR in the TTI, when the TTI is not a measurement gap, and when an SR prohibition timer, for example, an sr-ProhibitTimer is not driving,
if SR_COUNTER<dsr-TransMax,
the MAC entity increases the SR_COUNTER by 1,
instructs a physical layer to signal the SR on a PUCCH, and
starts the sr-ProhibitTimer.
In other cases,
the MAC entity notifies an RRC layer to release a PUCCH/SRS of an entire serving cell.
The MAC entity clears random preset entire downlink allocation and uplink grant and
starts a random access procedure.

The SR may be transmitted at a predetermined transmission-possible subframe.

Figure 7:
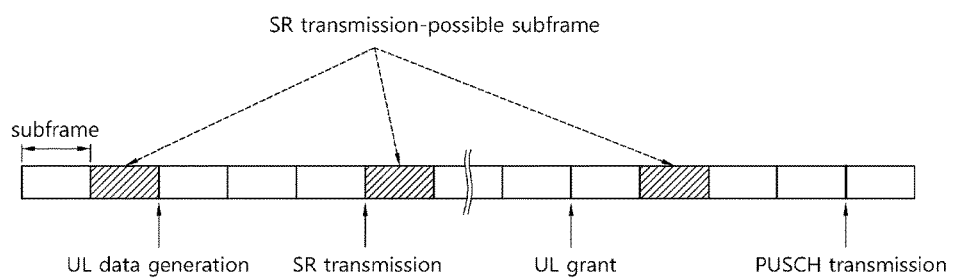
FIG. 7 illustrates an example of a Scheduling Request (SR) transmission mechanism.

FIG. 7 illustrates an example of a Scheduling Request (SR) transmission mechanism.

In an example of FIG. 7, when UL grant does not exist, the UE transmits an SR to a previously reserved SR transmission-possible subframe. Transmission of the SR may be repeated until UL grant is received.

A subframe to which the SR is transmitted is a subframe satisfying the following condition.

$$(10 \times n_f + \lfloor n_s/2 \rfloor - N_{OFFSET,SR}) \bmod SR_{PERIODCITY} = 0 \quad \text{[Equation 1]}$$

The $n_s$ is the slot number. $n_f$ is a system frame number (SFN) of a radio frame.

The $SR_{PERIDOCITY}$ is an SR transmission period, and the $N_{OFFSET,SR}$ is SR subframe offset. The $SR_{PERIDOCITY}$ and the $N_{OFFSET,SR}$ are SR setup and are determined according to Table 2 by an parameter sr-ConfigIndex $I_{SR}$ transferred from the base station by higher layer signaling (e.g., RRC signal).

TABLE 2

| SR setup index $I_{SR}$ | SR period (ms) $SR_{PERIDOCITY}$ | SR subframe offset $N_{OFFSET,SR}$ |
| --- | --- | --- |
| 0-4 | 5 | $I_{SR}$ |
| 5-14 | 10 | $I_{SR}$ − 5 |
| 15-34 | 20 | $I_{SR}$ − 15 |
| 35-74 | 40 | $I_{SR}$ − 35 |
| 75-154 | 80 | $I_{SR}$ − 75 |
| 155-156 | 2 | $I_{SR}$ − 155 |
| 157 | 1 | $I_{SR}$ − 157 |

<Carrier Aggregation>

Hereinafter, a carrier aggregation (CA) system will be described.

The CA system means a system that aggregates a plurality of component carriers (CC). A meaning of an existing cell has been changed by such carrier aggregation. By carrier aggregation, a cell may mean a combination of a downlink component carrier and an uplink component carrier or a single downlink component carrier.

Further, in carrier aggregation, the cell may be classified into a primary cell, a secondary cell, and a serving cell. The primary cell means a cell operating in a primary frequency and means a cell in which the UE performs an initial connection establishment procedure or a connection reestablishment process with the base station or a cell instructed to a primary cell in a handover process. The secondary cell means a cell operating in a secondary frequency, is a cell set when an RRC connection is established, and is used for providing an additional wireless resource.

As described above, a carrier aggregation system may support a plurality of component carriers (CC), i.e., a plurality of serving cells unlike a single carrier system.

Such a carrier aggregation system may support cross-carrier scheduling. The cross-carrier scheduling is a scheduling method that can perform resource allocation of a PDSCH transmitted through another component carrier through a PDCCH transmitted using a specific component carrier and/or resource allocation of a PUSCH transmitted through other component carriers other than component carriers basically linked to the specific component carrier.

<Machine Type Communication (MTC)>

Hereinafter, MTC will be described.

Figure 8A:
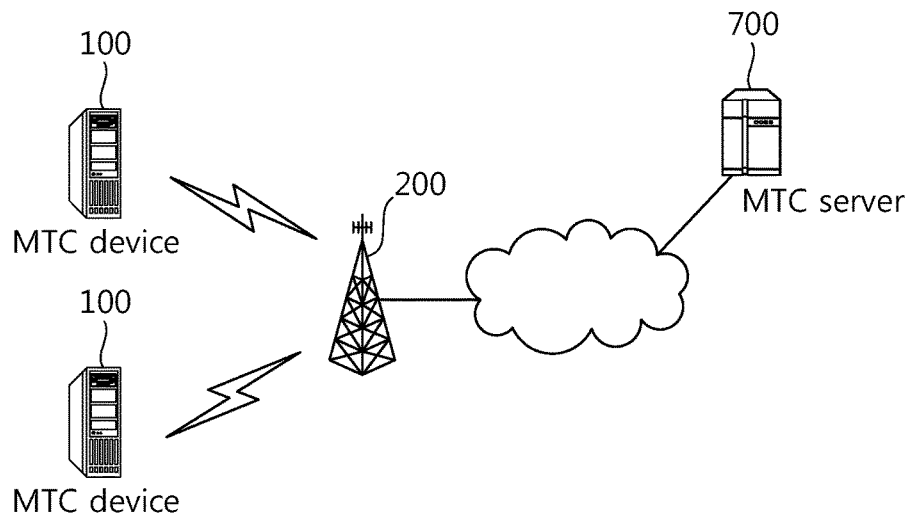
FIG. 8a illustrates an example of Machine Type communication (MTC).

FIG. 8a illustrates an example of MTC.

MTC indicates information exchange between MTC devices 100 not requiring a human interaction through a base station 200 or information exchange between the MTC device 100 and an MTC server 700 through a base station.

The MTC server 700 is an entity that communicates with the MTC device 100. The MTC server 700 executes an MTC application and provides an MTC specific service to the MTC device.

The MTC device 100 is a wireless device that provides MTC communication and may be fixed or may have mobility.

A service provided through MTC is different from an existing service in communication in which a person intervenes and includes various categories of services such as tracking, metering, payment, medical field service, and remote control. More specifically, a service provided through MTC may include meter reading, water level measurement, use of a surveillance camera, and stock report of a vending machine.

Singularity of the MTC device is that a transmission data amount is less and that uplink/downlink data transmission and reception sometimes occurs and thus it is efficient to lower a cost of the MTC device and to reduce battery consumption according to such a low data transmission rate. It is characterized in that such an MTC device has less mobility and thus a channel environment little changes.

MTC may be referred to as Internet of Things (IoT). Therefore, the MTC device may be referred to as an IoT device.

Figure 8B:
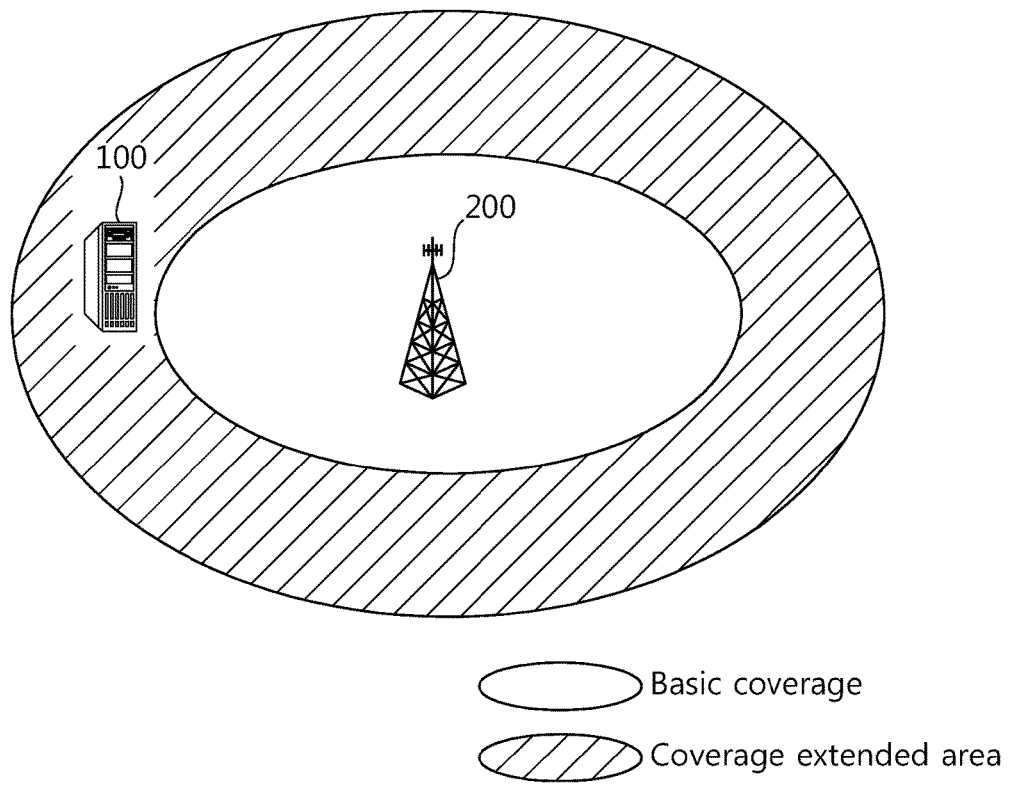
FIG. 8b illustrates extension or enhancement of cell coverage for an MTC device.

FIG. 8b illustrates extension or enhancement of cell coverage for an MTC device.

Nowadays, for the MTC device 100, it is considered to extend or enhance cell coverage of the base station, and for extension or enhancement of cell coverage, various techniques have been discussed.

However, when cell coverage is extended or enhanced, if the base station transmits a downlink channel to an MTC device positioned at a coverage extension (CE) or coverage enhancement (CE) region, the MTC device suffers the difficulty in receiving the downlink channel.

Figure 9:
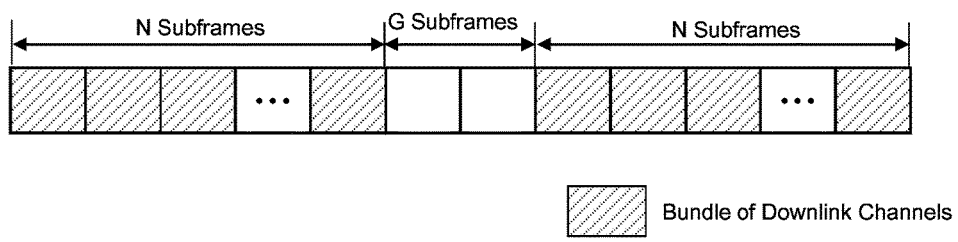
FIG. 9 is a diagram illustrating an example of transmitting a bundle of downlink channels.

FIG. 9 is a diagram illustrating an example of transmitting a bundle of downlink channels.

As can be seen with reference to FIG. 9, the base station repeatedly transmits a downlink channel (e.g., PDCCH and/or PDSCH) to the MTC device 100 positioned in a coverage extension area on several subframes ((e.g., the N number of subframes). In this way, downlink channels repeated on the several subframes are referred to as a bundle of downlink channels.

The MTC device receives a bundle of downlink channels on several subframes, decodes a portion or the entire of the bundle, thereby enhancing a decoding success rate.

Figure 10A:
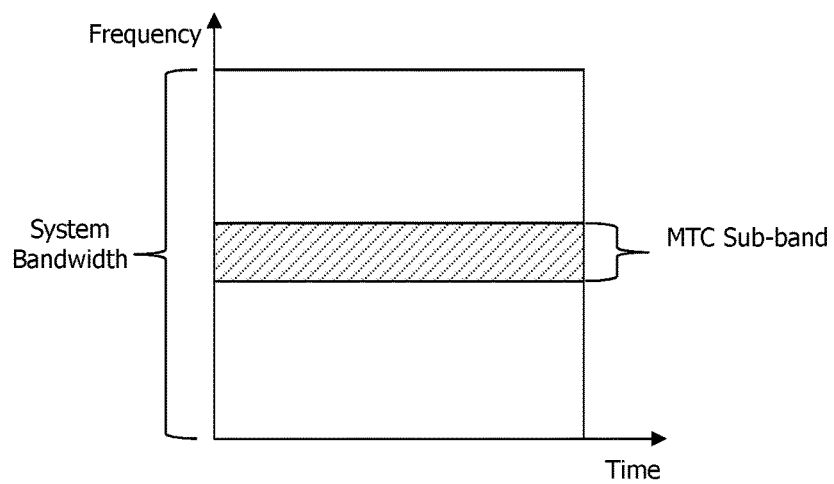
FIGS. 10a and 10b are diagrams illustrating an example of a sub-band in which an MTC device operates.
Figure 10B:
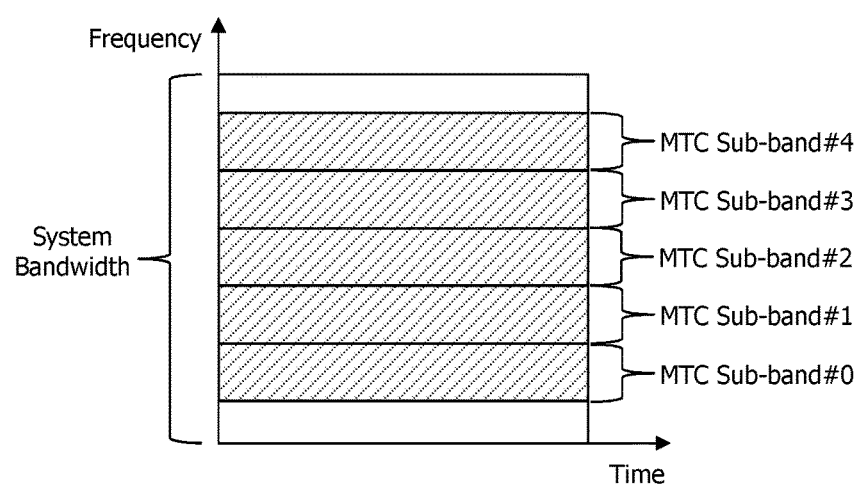

FIGS. 10a and 10b are diagrams illustrating an example of a sub-band in which an MTC device operates.

As one method for a low-cost of the MTC device, as shown in FIG. 10a, the MTC device may use a sub-band of, for example, about 1.4 MHz regardless of a system bandwidth of a cell.

In this case, an area of a sub-band in which such an MTC device operates may be positioned at a central area (e.g., 6 PRBs of the center) of a system bandwidth of the cell, as shown in FIG. 10a.

Alternatively, as shown in FIG. 10b, for multiplexing within a subframe between MTC devices, by installing several sub-bands as a sub-band of the MTC device in one subframe, MTC devices may use different sub-bands. In this case, most MTC devices may use another sub-band instead of the central area (e.g., 6 PRBs of the center) of the system band of the cell.

Alternatively, for an MTC device operating on a reduced partial band, a redefinition of an RB mapping method or a transmitting method of physical channels may be required.

<Disclosure of the Present Specification>

Therefore, a disclosure of the present specification provides a method of solving such a problem.

As one method for solving this, a method in which an MTC device of low-complexity/low-specification/low-cost transmits an SR is suggested. Specifically, a disclosure of the present specification describes a method of setting an SR parameter for the MTC device and a method in which the MTC device repeatedly transmits an SR.

Hereinafter, in the present specification, an MTC device operating in a reduced bandwidth according to low-complexity/low-capability/low-specification/low-cost is referred to as an LC device or a bandwidth reduced low complexity (BL) device. Here, according to a disclosure of the present specification, coverage extension/enhancement (CE) may be classified into two modes. A first mode (or referred to as a CE mode A) is a mode in which repetition transmission is not performed or for the small number of repetition transmission.

A second mode (or referred to as a CE mode B) is a mode in which the many number of repetition transmission is allowed. A mode to operate among two modes may be signaled to the LC device. Here, parameters in which the LC device assumes for transmission and reception of a control channel/data channel may be changed according to the CE mode. Further, a DCI format monitored by the LC device may be changed according to a CE mode. However, some physical channels may be repeatedly transmitted by the same number regardless of a CE mode A and a CE mode B.

I. Disclosure of the Present Specification: SR Setup

A general UE may transmit an SR on a subframe determined by a UE-specifically set period and offset, as in Equation 1, and an SR period actually transmitted by an sr-ProhibitTimer in a subframe in which a corresponding SR may be transmitted is represented in a format that multiplies a period to an SR resource.

The LC device may repeatedly transmit an SR according to a CE mode on a plurality of subframes. Therefore, it is necessary to redefine a resource, a start position, and a related procedure in which an SR may be repeatedly transmitted.

Specifically, a method of setting a start position of repetition transmission of the SR may consider a format in which the SR sets a transmission-possible subframe, i.e., setup based on a period and offset of a subframe. The SR (i) may be continuously transmitted by the entire repetition number previously or set in a higher layer from the SR repetition start position, (ii) may be transmitted to an SR resource through a preset subframe, and (iii) may be a format that corresponds the entire repetition number in a format that burst performs repetition transmission of the SR by the number previously or set in a higher layer from each SR subframe and that repeats this in a next SR subframe. As an example of (iii), when a transmission period of an SR subframe is 10 msec and when the entire repetition number is 10, the SR may have a format that transmits two continued SRs over 5 radio frames in each radio frame.

The (i) will be described with reference to FIG. 11.

Figure 11:
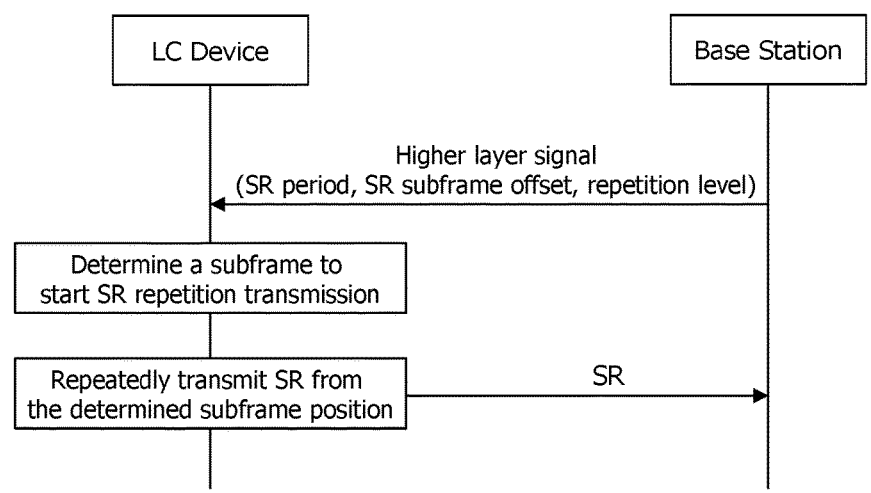
FIG. 11 illustrates an example of determining a subframe for repetition transmission of an SR according to a disclosure of the present specification.

FIG. 11 illustrates an example of determining a subframe for repetition transmission of an SR according to a disclosure of the present specification.

As can be seen with reference to FIG. 11, the base station transfers a higher layer signal (e.g., RRC signal) including a repetition level in addition to an SR period ($SR_{PERIODCITY}$) and SR subframe offset ($N_{OFFSET,SR}$) to the LC device.

The LC device determines a subframe position to start repetition transmission of the SR based on the SR period ($SR_{PERIODCITY}$) and SR subframe offset ($N_{OFFSET,SR}$).

Thereafter, the LC device repeatedly transmits the SR from the determined subframe position. Here, the repetition transmission number may be determined according to the repetition level.

A repetition of a continuous or discontinuous SR corresponding to the entire repetition number may be referred to as an SR bundle and may become a reference when designating dr-TransMax of the SR or when applying an sr-ProhibitTimer. For example, when dr-TransMax is set to 4, after transmission of 4 times based on an SR bundle, SR transmission through a PUCCH may be stopped, scheduling may be cancelled, and a PRACH may be transmitted. The sr-ProhibitTimer may not be applied within an SR bundle. Alternatively, the dr-TransMax or the sr-ProhibitTimer may be applied based on a parameter including a repetition level or the repetition number.

When the LC device prepares a buffer status report (BSR) in a MAC PDU or when the LC device receives UL grant and receive currently pending uplink data through UL grant, the LC device may cancel and not transmit entire SRs. However, when the LC device operates in a CE mode B, there is a high possibility that the base station is to repeatedly transmit UL grant, and in this case, even if the base station transmits UL grant, until the LC device appropriately detects UL grant, a predetermined time is required and thus the LC device may repeatedly transmit an SR for a corresponding time. The base station may detect an SR with reception of only some of repetition transmission of an SR according to a channel situation, but for appropriate scheduling setup later, after the entire of repetition transmission of an SR is received, the base station may determine whether to detect an SR. In this case, the LC device may not transmit an SR from a detection time point of UL grant and change and transmit a transmitting method of an SR while SR repetition transmission is performed. As an example of the description, for a positive SR, when a PUCCH is generated and transmitted based on +1, for the remaining transmission of SR repetition transmission, in order to represent a negative SR, a PUCCH may be generated and transmitted based on a value −1.

II. Another Disclosure of the Present Specification: Simultaneous Transmission of SR and HARQ-ACK/NACK According to another disclosure of the present specification, the LC device may repeatedly transmit HARQ-ACK/NACK. In general, it may not be assumed that a start point and an end point of HARQ-ACK/NACK repetition and a start point and an end point of SR repetition always correspond. Further, the SR is transmitted by the LC device and the base station performs blind detection, however in a case of HARQ-ACK, because the LC device transmits HARQ-ACK based on downlink scheduling, the base station may know a detection time point.

It may be considered that simultaneous transmission of SR and HARQ-ACK/NACK is performed with divided into the following situations.

II-1. After SR is Triggered, when HARQ-ACK/NACK is Transmitted

According to a first illustration, an SR is triggered and according to whether HARQ-ACK/NACK is transmitted within a specific detection window, the LC device may determine whether to transmit a PUCCH (or PRACH) including only an SR after a time point in which a corresponding detection window is terminated or to simultaneously transmit HARQ-ACK and SR within a corresponding detection window. The detection window may be defined by a timer activated after SR is triggered. Transmission of HARQ-ACK/NACK may be performed with the start of actual HARQ-ACK/NACK transmission or may be performed by securement of a HARQ-ACK/NACK resource through detection of (E)PDCCH. In a latter case, even after a detection window is terminated, SR transmission may be delayed up to corresponding HARQ-ACK/NACK. Alternatively, HARQ-ACK/NACK may unconditionally have a priority, and a priority may differently set according to a HARQ-ACK/NACK state. Here, when HARQ-ACK has a priority, transmission of the SR is dropped, but transmission of the SR may not be cancelled. In another example, a priority may be given to a channel transmitted before SR or HARQ-ACK/NACK.

According to a second illustration, when an SR is triggered, the LC device may start to transmit a PUCCH including the SR through an SR resource. However, the LC device may transmit HARQ-ACK in an SR resource from a transmission time point of HARQ-ACK. In this case, it may be necessary that the base station comprehensively detects a HARQ-ACK/NACK resource and an SR resource to estimate a HARQ-ACK/NACK position.

According to a third illustration, when an SR is triggered, the LC device may start to transmit a PUCCH including the SR through an SR resource. In this case, the LC device may transmit the SR using a PUCCH format 1b, assume a most significant bit (MSB) to 0, set a least significant bit (LSB) to 1 for a positive SR, and may not transmit a PUCCH for a negative SR.

Further, the LC device may change and transmit an MSB of a PUCCH format 1b transmitted through an SR resource from a transmission time point of HARQ-ACK according to a HARQ-ACK/NACK value. Even if SR repetition is ended, when HARQ-ACK/NACK repetition is remained, the LC device may continue to maintain an SR resource. When it is assumed that anyone LC device repeatedly transmits one HARQ-ACK/NACK at one time point, the LC device may transmit HARQ-ACK/NACK with one of PUCCH format 1b resources. In a negative SR situation, when HARQ-ACK is not transmitted, the LC device does not transmit a PUCCH, and when HARQ-ACK/NACK is transmitted, the LC device may set 0 to a PUCCH format 1b LSB.

According to a fourth illustration, only when transmitting HARQ-ACK/NACK, it may be considered that the LC device transmits an SR. When the SR is transmitted using a HARQ-ACK/NACK resource, HARQ-ACK and SR may be joint coded through a PUCCH, and when the SR is transmitted through an SR resource, it may be interpreted that HARQ-ACK/NACK is always transmitted through an SR resource.

According to a fifth illustration, it may be considered that the SR is joint coded and transmitted with periodic CSI. That is, the SR may be encoded together with CSI information at a transmission time point of periodic CSI to be transmitted using a PUCCH format 2. Even when it is unnecessary to transmit HARQ-ACK/NACK, the SR is transmitted through periodic CSI, and when the SR and periodic CSI are joint coded, a value of the SR may be 1 in a positive case and may be 0 in a negative case.

Here, only when the SR is transmitted together with HARQ-ACK/NACK or periodic CSI, when the SR is set to be transmitted, if the SR is not transmitted for a predetermined time with absence of HARQ-ACK/NACK or periodic CSI, the LC device may transmit the SR through a PRACH. Further, in the foregoing description, in repetition transmission of the SR, when some transmissions are dropped, the SR is not cancelled, and when the SR is not transmitted, a counter of the SR transmission number is not increased. For this reason, when the SR is not transmitted, the LC device may signal corresponding indication information to a higher layer.

II-2. When SR is Triggered while Transmitting HARQ-ACK/NACK

According to a first illustration, until preceding repetition transmission of HARQ-ACK/NACK is terminated, the LC device may not transmit an SR. In this case, transmission of the SR is not cancelled.

According to a second illustration, the LC device may perform repetition transmission of HARQ-ACK/NACK through a HARQ-ACK/NACK resource. When the SR is triggered, the LC device may transmit HARQ-ACK/NACK through an SR resource from a corresponding time point.

According to a third illustration, when the SR is triggered while repetition transmission of HARQ-ACK/NACK, the LC device may set an LSB of a PUCCH format 1b to 1 from a corresponding time point. In this case, when the LSB is 0 or 1, the base station may add a soft value of the MSB. When repetition transmission of the SR remains at a time point in which repetition transmission of HARQ-ACK/NACK is terminated, the LC device may maintain a resource of HARQ-ACK/NACK. That is, the LC device may perform the remaining transmission of repetition transmission of the SR through the HARQ-ACK/NACK resource. When it is assumed that one LC device performs repetition transmission of one HARQ-ACK/NACK at one time point, the LC device may transmit HARQ-ACK using one of PUCCH format 1b resources. In a situation of a negative SR, when HARQ-ACK/NACK is not transmitted, the LC device does not transmit a PUCCH, and when HARQ-ACK/NACK is transmitted, the LC device may set 0 to the LSB of a PUCCH format 1b.

According to a fourth illustration, only when HARQ-ACK is transmitted, it may be considered that the LC device transmits an SR. In this case, when the SR is transmitted through a HARQ-ACK/NACK resource, HARQ-ACK and the SR may be joint coded, and when the SR is transmitted through an SR resource, HARQ-ACK/NACK may be always transmitted through an SR resource.

According to a fifth illustration, the LC device may joint code and transmit the SR with periodic CSI. That is, the SR may be encoded together with CSI information at a transmission time point of periodic CSI to be transmitted using a PUCCH format 2. Even when transmission of HARQ-ACK/NACK does not exist, the SR is transmitted through periodic CSI, and when the SR is joint coded together with CSI, a value of the SR may be 1 in a positive case and may be 0 in a negative case.

Here, only when HARQ-ACK/NACK or periodic CSI is transmitted, if the SR is set to be transmitted, when the SR is not transmitted for a predetermined time with absence of HARQ-ACK/NACK or periodic CSI, the LC device may transmit the SR through a PRACH. Further, in repetition transmission of the SR, when some transmission of the SR is dropped, the SR is not cancelled, and when the SR is not transmitted, the LC device may not increase a counter of the transmission number of the SR. For this reason, when the SR is not transmitted, the LC device may signal corresponding indication information to a higher layer.

According to a disclosure of the present specification described in the foregoing description, even in a situation in which an LC device operates with a reduced bandwidth, an SR may be efficiently transmitted and thus a base station may efficiently perform uplink scheduling based on a corresponding SR.

As described above, exemplary embodiments of the present invention may be implemented through various means. For example, exemplary embodiments of the present invention may be implemented by hardware, firmware, software, or a combination thereof. Specifically, exemplary embodiments of the present invention will be described with reference to the drawings.

Figure 12:
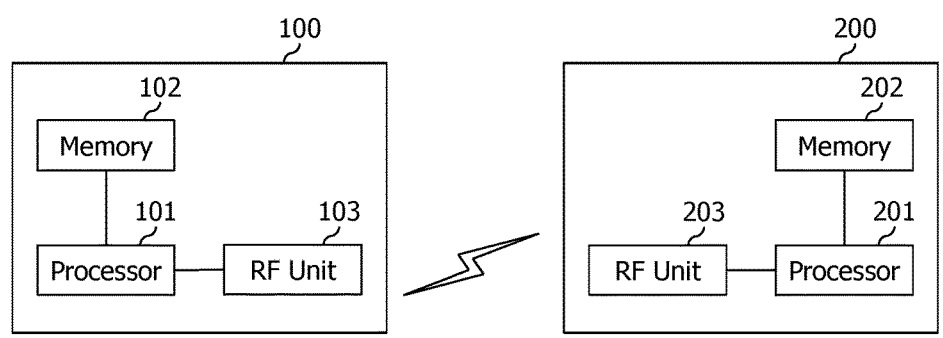
FIG. 12 is a block diagram illustrating a wireless communication system that implements a disclosure of the present specification.

FIG. 12 is a block diagram illustrating a wireless communication system that implements a disclosure of the present specification.

A base station 200 includes a processor 201, a memory 202, and a transmitting and receiving unit (or a radio frequency (RF) unit) 203. The memory 202 is connected to the processor 201 to store various information for driving the processor 201. The transmitting and receiving unit (or RF unit) 203 is connected to the processor 201 to transmit and/or receive a wireless signal. The processor 201 implements a suggested function, process, and/or method. In the foregoing exemplary embodiment, operation of the base station may be implemented by the processor 201.

An LC device 100 includes a processor 101, a memory 102, and a transmitting and receiving unit (or RF unit) 103. The memory 102 is connected to the processor 101 to store various information for driving the processor 101. The transmitting and receiving unit (or RF unit) 103 is connected to the processor 101 to transmit and/or receive a wireless signal. The processor 101 implements a suggested function, process, and/or method.

The processor may include an application-specific integrated circuit (ASIC), another chipset, a logic circuit, and/or a data processor. The memory may include a read-only memory (ROM), a random access memory (RAM), a flash memory, a memory card, a storage medium, and/or another storage device. The RF unit may include a baseband circuit for processing a wireless signal. When an exemplary embodiment is implemented with software, the above-described technique may be implemented with a module (process, function) that performs the above-described function. The module may be stored at a memory and may be executed by the processor. The memory may exist at the inside or the outside of the processor and may be connected to the processor with well-known various means.

In the above illustrated systems, although the methods have been described on the basis of the flowcharts using a series of steps or blocks, the present invention is not limited to the sequence of the steps, and some of the steps may be performed with different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a scheduling request (SR), the method performed by a device configured for a coverage enhancement and comprising:
   receiving a higher layer signal including a SR transmission periodicity and a SR subframe offset, the higher layer signal further including information on a repetition number;
   determining a first subframe to start a transmission of the SR based on the SR transmission periodicity and the SR subframe offset;
   determining a number of subframes used for repeatedly transmitting the SR based on the information; and
   transmitting the SR on the determined first subframe,
   wherein the SR is repeatedly transmitted over a plurality of consecutive subframes starting from the determined first subframe by the determined number of subframes.

2. The method of claim 1, wherein
   if transmission of hybrid automatic repeat request (HARQ) acknowledgement (ACK)/non-acknowledgement (NACK) is required after the SR is triggered, the SR is transmitted using a Physical Uplink Control Channel (PUCCH) format 1B, and
   a Most Significant Bit (MSB) of the SR is set to 0, and when the SR is a positive SR, a Least Significant Bit (LSB) of the SR is set to 1.

3. The method of claim 1, wherein an MSB of the SR is set according to a value of the HARQ ACK/NACK from a transmission time point of the HARQ ACK/NACK, when transmission of HARQ ACK/NACK is required, after the SR is triggered.

4. The method of claim 1, wherein the SR is together transmitted only when HARQ ACK/NACK is transmitted.

5. The method of claim 4, wherein the SR is joint encoded and transmitted with the HARQ ACK/NACK.

6. The method of claim 1, wherein the SR is together transmitted only when periodic Channel State Information (CSI) is transmitted.

7. The method of claim 6, wherein the SR is joint encoded and transmitted with the periodic CSI.

8. A device for transmitting a scheduling request (SR), the device configured for a coverage enhancement and comprising:
   a transceiver configured to receive a higher layer signal including a SR transmission periodicity and a SR subframe offset, the higher layer signal further including information on a repetition number; and
   a processor configured to
   determine a first subframe to start a transmission of the SR based on the SR transmission periodicity and the SR subframe offset;
   determine a number of subframes used for repeatedly transmitting the SR based on the information; and
   control the transceiver to transmit the SR on the determined first subframe,
   wherein the SR is repeatedly transmitted over a plurality of consecutive subframes starting from the determined first subframe by the determined number of subframes.

9. The device of claim 8, wherein
   if transmission of hybrid automatic repeat request (HARQ) acknowledgement (ACK)/non-acknowledgement (NACK) is required after the SR is triggered, the SR is transmitted using a Physical Uplink Control Channel (PUCCH) format 1B, and
   a Most Significant Bit (MSB) of the SR is set to 0, and when the SR is a positive SR, a Least Significant Bit (LSB) of the SR is set to 1.

10. The device of claim 8, wherein an MSB of the SR is set according to a value of the HARQ ACK/NACK from a time point in which the HARQ ACK/NACK is transmitted, when transmission of HARQ ACK/NACK is required, after the SR is triggered.

* * * * *